(12) United States Patent
Beltramin

(10) Patent No.: US 9,939,310 B2
(45) Date of Patent: Apr. 10, 2018

(54) PAYLOAD MONITORING SYSTEM FOR HAUL VEHICLE

(71) Applicant: Caterpillar Inc., Peoria, IL (US)

(72) Inventor: Sidarta Fornari Beltramin, Curitiba (BR)

(73) Assignee: Zeít Comercío e Montagem de Equipamentos Electronicos Ltda (BR)

( * ) Notice: Subject to any disclaimer, the term of this patent is extended or adjusted under 35 U.S.C. 154(b) by 196 days.

(21) Appl. No.: 14/944,805

(22) Filed: Nov. 18, 2015

(65) Prior Publication Data

US 2016/0187182 A1 Jun. 30, 2016

Related U.S. Application Data

(60) Provisional application No. 62/098,493, filed on Dec. 31, 2014.

(51) Int. Cl.
*G01G 19/04* (2006.01)
*G01F 22/00* (2006.01)

(52) U.S. Cl.
CPC ............. *G01G 19/04* (2013.01); *G01F 22/00* (2013.01)

(58) Field of Classification Search
CPC ................................ G01F 22/00; G01G 19/04
See application file for complete search history.

(56) References Cited

U.S. PATENT DOCUMENTS

| | | | | |
|---|---|---|---|---|
| 6,928,141 B2* | 8/2005 | Carver | ................... | G01N 23/04 378/197 |
| 8,284,096 B2* | 10/2012 | Martinez Godoy | .... | G01S 13/88 342/22 |
| 9,404,899 B1* | 8/2016 | Konopka | ........... | G08B 13/1609 |
| 2010/0332051 A1* | 12/2010 | Kormann | ................ | A01F 12/46 701/2 |
| 2013/0101172 A1* | 4/2013 | Parikh | .................... | G06T 7/0004 382/104 |
| 2017/0009408 A1* | 1/2017 | Marsolek | .............. | E01C 23/088 |
| 2017/0053220 A1* | 2/2017 | Marsolek | ........... | G06Q 10/0637 |

* cited by examiner

*Primary Examiner* — Natalie Huls
(74) *Attorney, Agent, or Firm* — Finnegan, Henderson, Farabow, Garrett & Dunner, LLP

(57) ABSTRACT

A payload monitoring system is disclosed for use with a haul vehicle. The payload monitoring system may have at least one emitter configured to direct an energy beam into the haul vehicle during relative movement between the at least one emitter and the haul vehicle, and at least one receiver configured to detect the energy beam and to generate a corresponding signal. The payload monitoring system may also have a controller in communication with the at least one receiver and configured to determine a loading condition of the haul vehicle based on the corresponding signal.

12 Claims, 3 Drawing Sheets

PAYLOAD MONITORING SYSTEM FOR HAUL VEHICLE

RELATED APPLICATIONS

This application is based on and claims priority to U.S. Provisional Application No. 62/098,493 filed on Dec. 31, 2014, the contents of which are expressly incorporated herein by reference.

TECHNICAL FIELD

The present disclosure is directed to a payload monitoring system and, more particularly, to a payload monitoring system for a haul vehicle.

BACKGROUND

Mobile haul vehicles, such as railcars, are used to haul ore between different locations. For example, the railcars can be loaded with ore at a mine site, and transport the ore to a final use location or to a port at which the ore is offloaded to a ship. The ore can be loaded onto the railcars via excavation machines (e.g., wheel loaders, rope shovels, hydraulic shovels, etc.) or an automated hopper/feeder, and unloaded by way of a rotary dumper that holds each car while flipping it upside-down.

Care should be taken when loading and unloading haul vehicles. Specifically, it can be important to load each vehicle with a productive amount of ore that does not overburden the vehicle. Similarly, the load should be distributed evenly to promote smooth operation of the haul vehicle without causing damage. It can also be important to completely empty the vehicle during unloading so as to be efficient in the hauling process. If some ore is left in the vehicle after loading, in addition to reducing an efficiency of the vehicle, the remaining ore could imbalance the vehicle. An imbalanced vehicle has the potential to cause premature wear.

Historically, loading and unloading of a haul vehicle has been manually observed or monitored. In particular, as the vehicle is being loaded, an operator of the excavation machine and/or the hopper/feeder would look into the haul vehicle and make a judgment call as to when the vehicle is properly loaded and balanced. Likewise, after the vehicle has been flipped over during unloading, the operator of the rotary dumper would look into the vehicle and determine if an amount of ore remaining in the vehicle is significant enough and/or critically positioned enough to warrant additional effort be spent removing the ore. While adequate for some applications, these processes may be labor intensive and prone to error.

The payload monitoring system of the present disclosure is directed towards overcoming one or more of the problems set forth above and/or other problems of the prior art.

SUMMARY

One aspect of the present disclosure is directed to a payload monitoring system for a haul vehicle. The payload monitoring system may include at least one emitter configured to direct an energy beam into the haul vehicle during relative movement between the at least one emitter and the haul vehicle, and at least one receiver configured to detect the energy beam and to generate a corresponding signal. The payload monitoring system may also include a controller in communication with the at least one receiver and configured to determine a loading condition of the haul vehicle based on the corresponding signal.

Another aspect of the present disclosure is directed to a method of monitoring payload of a haul vehicle. The method may include directing an energy beam from a source location into the haul vehicle during relative movement between the haul vehicle and the source location. The method may also include detecting the energy beam and generating a corresponding signal. The method may further include determining a loading condition of the haul vehicle based the corresponding signal.

DETAILED DESCRIPTION

Figure 1:
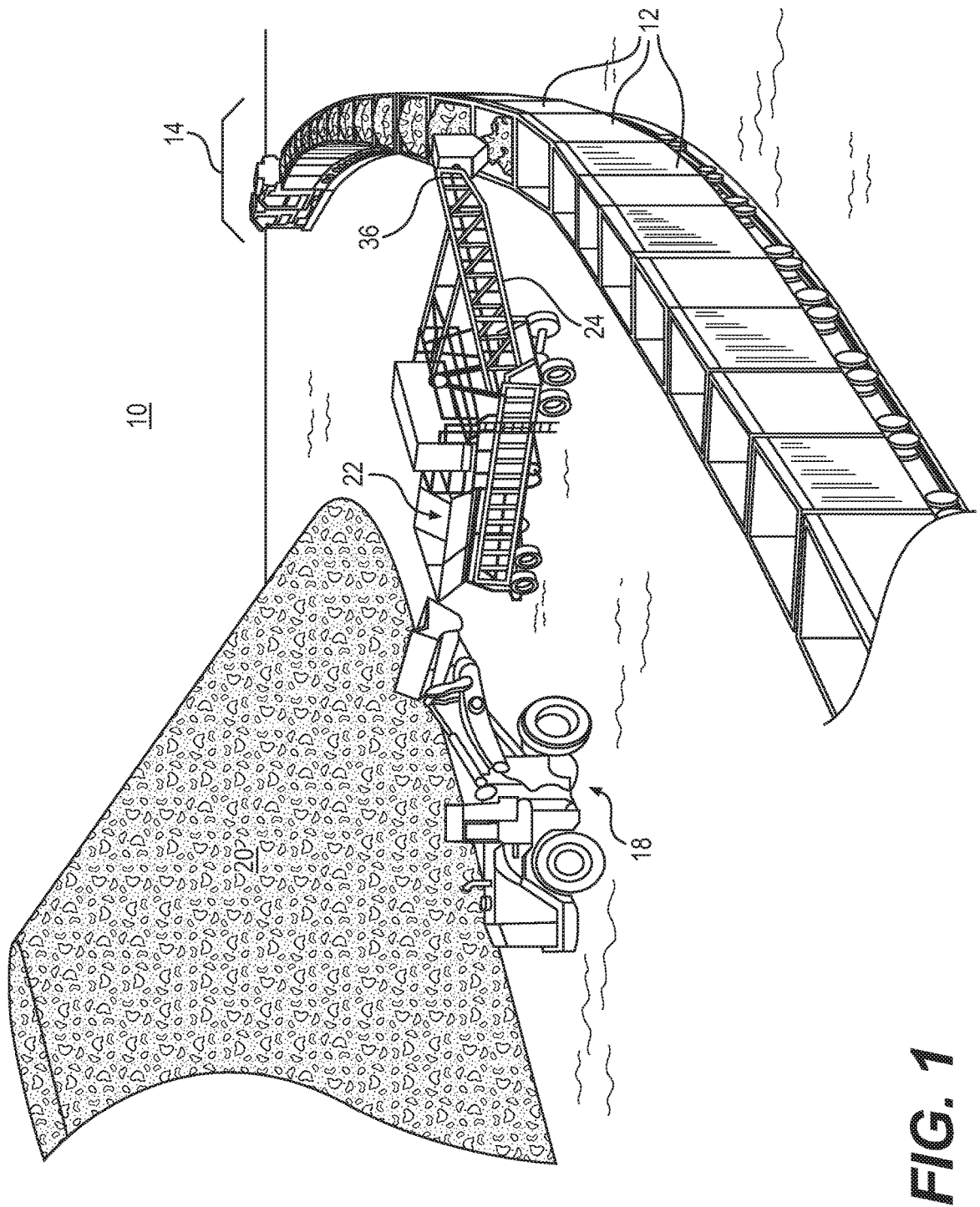
FIGS. 1 and 2 are isometric illustrations of exemplary disclosed worksites.
Figure 2:
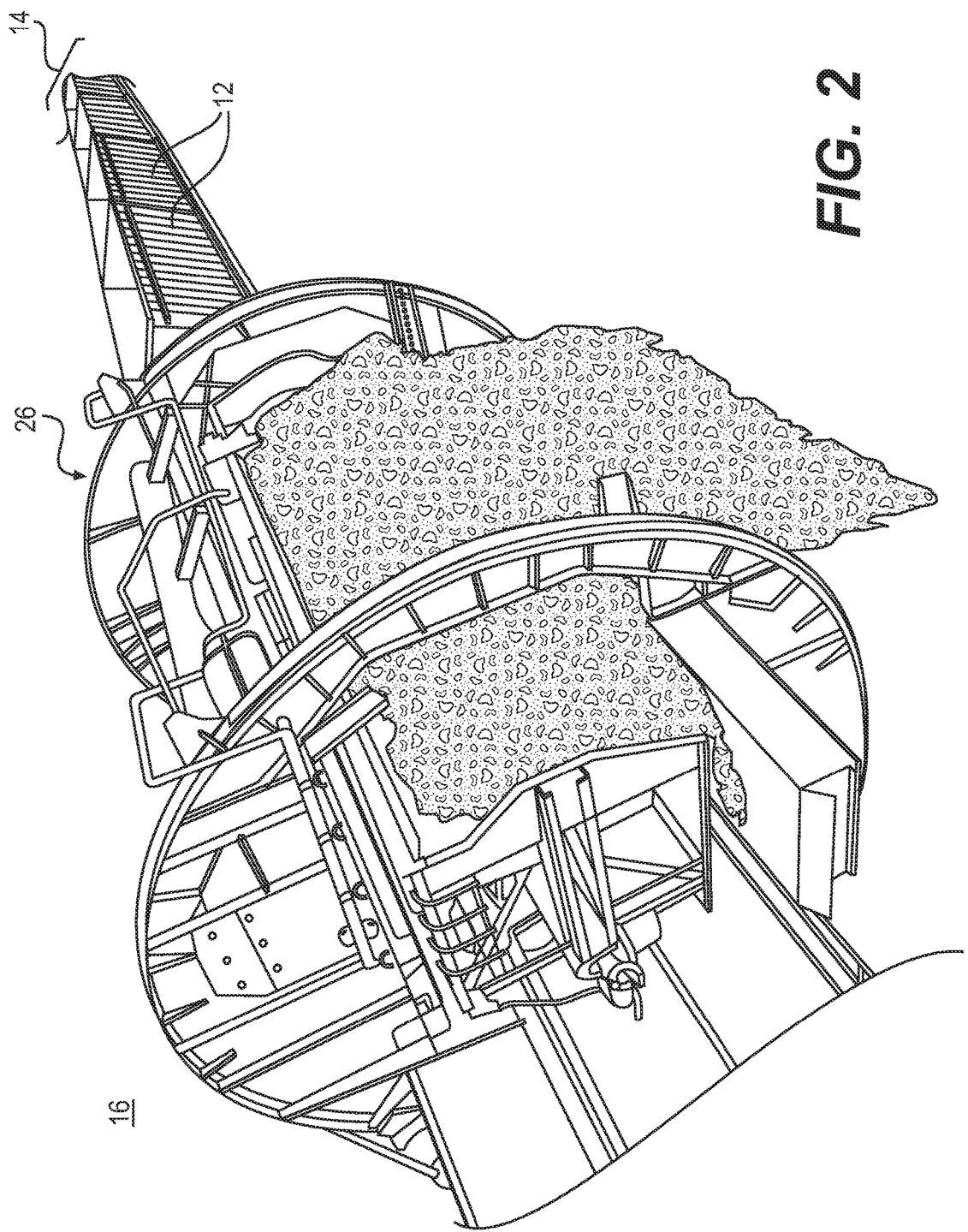

FIGS. 1 and 2 each illustrate an exemplary worksite associated with transportation of material (e.g., ore). Specifically, worksite 10 of FIG. 1 is associated with the loading of material into railcars 12 of a train 14, while worksite 16 of FIG. 2 is associated with unloading of the material. It should be noted that other worksites and/or haul vehicles may be utilized in conjunction with the disclosed concepts, if desired.

Equipment may be located at both worksites 10, 16 to facilitate the loading and unloading processes. For example, at worksite 10, a wheel loader 18 is used to scoop material from a pile 20 and to deposit the material into a hopper 22. A feeder 24 (e.g., a conveyor) may be associated with hopper 22 and configured to transport a steady stream of material to a location over railcars 12. In this arrangement, feeder 24 may be a continuous feeder that deposits the material into railcars 12 as railcars 12 continuously move past a distal end of feeder 24. In some arrangements, wheel loader 18 may directly load railcars 12, if desired. In the example shown in FIG. 2, railcars 12 are individually propelled into a rotary dumper 26, which functions to flip railcars 12 upside-down, thereby dumping the contents into a collection area below. Other methods and equipment may alternatively be used to unload railcars 12, if desired.

Each of the pieces of equipment shown in FIGS. 1 and 2 may have various controls used to affect the loading and unloading processes. For example, wheel loader 18 may be filled with more or less material, driven faster or slower, raised higher or lower, positioned differently, etc. Hopper 22 may be filled with more or less material; and feeder 24 may be elevated differently, positioned differently, and sped up or slowed down. Likewise, rotary dumper 26 may rotate to different angles, cycle through rotations multiple times, rotate at variable speeds, shake, etc. Each of these controls may be adjusted manually or automatically based on monitored loading conditions. For the purposes of this disclosure, the phrase "loading condition" may be considered an amount of material inside railcars 12 and/or a distribution or location of the material.

Figure 3:
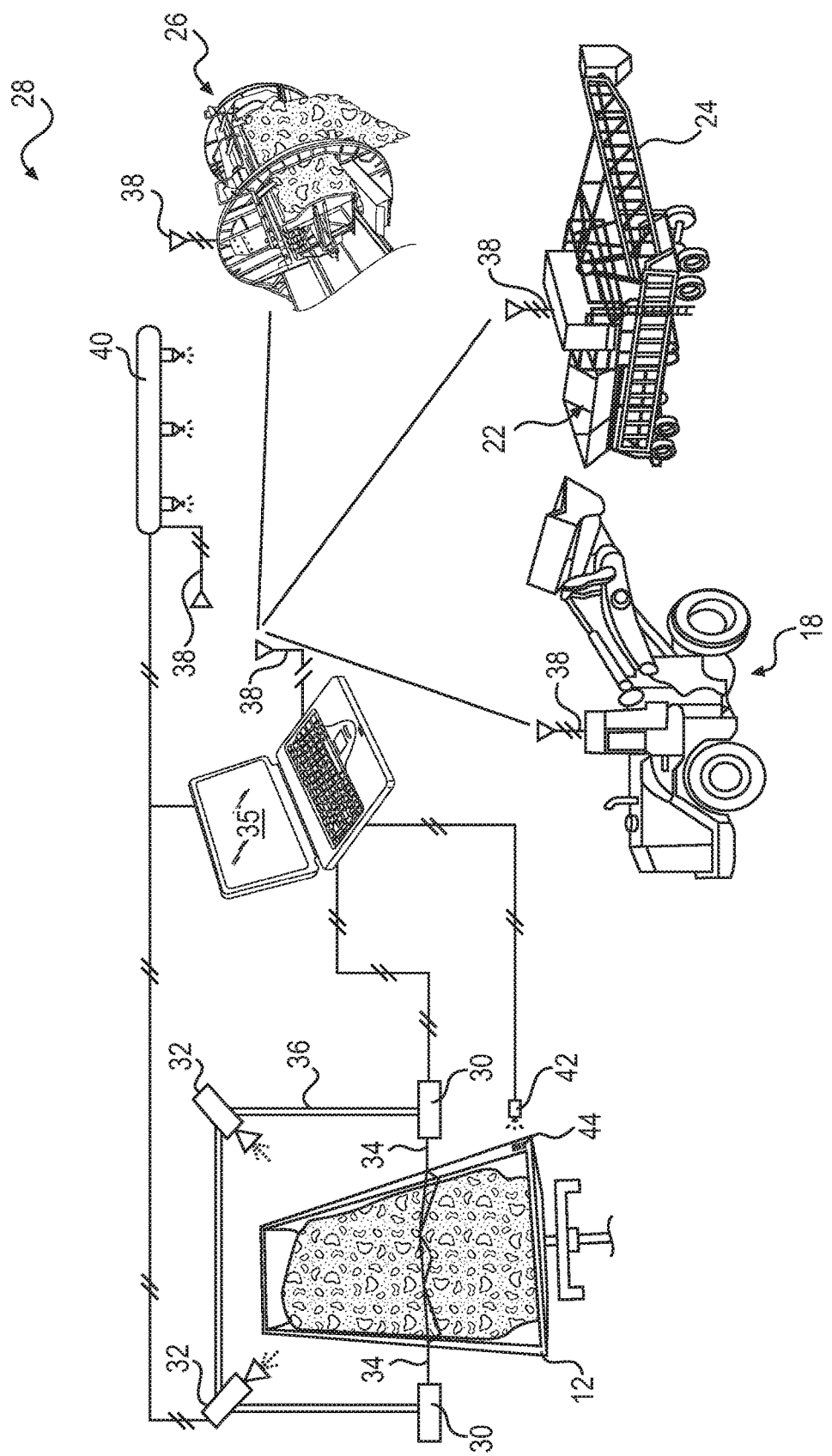
FIG. 3 is a diagrammatic illustration of an exemplary disclosed payload monitoring system that may be used in conjunction with the worksites of FIGS. 1 and 2.

FIG. 3 illustrates a payload monitoring system ("system") 28 that may be used at worksites 10, 16 in conjunction with the loading and unloading equipment described above. System 28 may include, among other things, at least one emitter 30, at least one receiver 32, and a controller 35 in communication with emitter 30. Two emitters 30 and two receivers 32 are shown in the example of FIG. 3. It should be noted, however, that any number of emitters 30 and any number of receivers 32 may be utilized.

Each emitter 30 may generate an energy beam 34 directed into railcar 12. In the example of FIG. 3, one emitter 30 is located at each side of railcar 12, and both emitters 30 are aligned with each other to generate a single continuous line of colored light across the material held inside of railcar 12 and across the inner walls of railcar 12. It is contemplated, however, that a single emitter 30 could be utilized for this purpose, and mounted directly over railcar 12. In the disclosed embodiment, emitter 30 is a laser that is configured to generate a line of colored light visible by receiver 32. Other types of emitters 30, for example a sound emitter, may also be utilized for this purpose, if desired.

Each receiver 32 may be utilized to detect energy beam 34 and to generate corresponding signals directed to controller 35. In the example of FIG. 3, one receiver 32 is located at each side of railcar 12, and both receivers 32 are configure to generate signals associated with different portions of energy beam 34. It is contemplated, however, that a single receiver 32 could be utilized for this purpose, and mounted directly over railcar 12. In the disclosed embodiment, receiver 32 is a camera configured to capture images of the line of colored light resulting from reflection of energy beam 34 off the material and walls inside railcar 12.

Energy beam 34 and the corresponding images may be generated as railcar 12 moves relative to a source location of emitters 30 and receivers 32. For example, as railcars 12 pass under feeder 24 (referring to FIG. 1), emitters 30 may generate a stationary line of line via laser beams 34, and receivers 32 may continuously photograph the line of light over the length of railcar 12 as railcar 12 passes under the light. In one embodiment, an image may be generated every 0.5 m along the length of railcar 12, these images then collected by controller 35 to form a composite image of the contours inside railcar 12. In this example, emitters 30 and receivers 32 may be mounted to stationary gantry 36 associated with the distal end of feeder 24.

In another example, emitters 30 and receivers 32 may be connected to movable gantry 36 associated with rotary dumper 26 (referring to FIG. 2). In this example, as railcars 12 are being flipped over by rotary dumper 26, emitters 30 and/or receivers 32 may move along gantry 36 to photograph the inside contours of railcar 12.

Controller 35 may be configured to receive the signals generated by receivers 32 and determine the loading characteristic of each railcar 12 based on the signals. Controller 35 may include a memory, a secondary storage device, a clock, and one or more processors that cooperate to accomplish a task consistent with the present disclosure. Numerous commercially available microprocessors can be configured to perform the functions of controller 35. It should be appreciated that controller 35 could readily embody a general controller capable of controlling numerous other equipment control functions at worksites 10 and 16. Various known circuits may be associated with controller 35, including signal-conditioning circuitry, communication circuitry, and other appropriate circuitry. It should also be appreciated that controller 35 may include one or more of an application-specific integrated circuit (ASIC), a field-programmable gate array (FPGA), a computer system, and a logic circuit configured to allow controller 35 to function in accordance with the present disclosure.

Based on the collection of images produced by receivers 32, controller 35 may create a virtual map of the inside of railcar 12. The virtual map may include the outer surface contours of the material and any exposed portions of the inner walls of railcar 12. In an exemplary embodiment, controller 35 may then compare this virtual map with a map stored in memory to determine the amount (e.g., a volume) and/or the distribution of the material inside railcar 12. The map stored in memory may correspond with the particular railcar 12 being photographed, and be created based at least in part on known geometry of that railcar 12.

Controller 35 may selectively generate a flag based on the comparison the two maps (i.e., based on the amount of material inside railcar 12). For example, during loading of railcars 12, controller 35 may determine a difference between the amount of material inside a particular railcar 12 and a known capacity of railcar 12. If the amount is significantly different (e.g., different by at least a threshold amount), controller 35 may generate the flag indicating under or overloading of the particular railcar 12. In another example, during unloading of railcars 12, controller 35 may quantify the amount of material remaining inside railcar 12 after the unloading process of that railcar 12 is complete based on the map comparison. If the remaining amount of material is more than a threshold amount, then controller 35 may generate the flag indicating incomplete unloading.

Controller 35 may also selectively rank the flags based on distribution of the material, the distribution also being determined from comparison of the maps. For example, during the loading process, if too much material is loaded into a particular railcar 12, but the material is centrally located such that railcar 12 is balanced, the ranking could be relatively low. In another example, if too much material remains within railcar 12 during unloading and is located high up on one side of railcar 12, the ranking could be relatively high.

The ranking performed by controller 35 may be selectively used by office personnel to implement future action. The future action could include, for example, affecting operation of the equipment at worksites 10 and/or 16, such that future loading or unloading processes do not generate the same flags. Additionally or alternative, the future actions could include the shifting (e.g., redistribution) of material within railcar 12, the dumping and reloading of railcar 12, or additional dumping actions. For example, service technicians could be dispatched to manually rake, shovel, or spray out the remaining material from railcar 12.

In some embodiments, controller 35 may selectively communicate with the equipment at worksites 10 and/or 16 to automatically implement the future actions. In particular, system 28 could include communication devices 38 associated with controller 35 and with one or more pieces of the equipment. In this embodiment, based on the rankings, controller 35 could be configured to wirelessly communicate instructions to operators of the equipment regarding future action that should be implemented manually. Additionally or alternatively, controller 35 could be configured to wirelessly communicate commands that result in automatically implemented future action. In one example associated with unloading of railcar 12, controller 35 may be configured to automatically actuate a fluid spray system 40, causing system 40 to spray jets of fluid into railcar 12. The jets of fluid may be used to dislodge material remaining inside railcar 12 after being flipped over by rotary dumper 26.

In some applications, the types of railcars 12 used to transport material may vary. In these applications, it can be important for controller 35 to know which railcar 12 is currently undergoing the loading/unloading process, such that controller 35 may make the correct comparisons using appropriate thresholds. In these applications, controller 35 may be configured to automatically identify each railcar 12 as it undergoes a particular process. In one example, the same or additional emitters 30 may be configured to direct energy beam 34 across an outer surface of railcar 12, and receivers 32 may be configured to capture images of corresponding colored lines on the outer surface. Controller 35 may then generate a virtual map of the outer surface, and compare this virtual map to a database of maps associated with different configurations of railcars 12. Based on the comparison, controller 35 may then identify the particular railcar 12, and use associated internal wall geometry and known capacities stored in memory in association with the railcar identification for the purposes of flagging and ranking.

In an alternative embodiment, controller 35 may rely on signals generated by an identification device 42. Identification device 42 could embody, for example, an RFID reader configured to detect and recognize a unique RFID tag 44 affixed to railcar 12. Based on this recognition, controller 35 may then be able to retrieve from memory the associated internal wall geometry and known capacities. Other types of identification devices and indices may also be possible.

INDUSTRIAL APPLICABILITY

The disclosed payload monitoring system may be used in conjunction with any type of haul vehicle known in the art. The payload monitoring system may be particularly applicable to trains having multiple railcars where efficiency and productivity are important. The disclosed payload monitoring system may help to improve productivity and efficiency by alerting personnel of improper loading conditions (e.g., under loading or incomplete unloading), and allowing the personnel to make adjustments to the railcar currently being loaded/unloaded as well as to the equipment implementing the process. In some instances, the disclosed payload monitoring system may also automatically implement future actions to improve conditions and the process.

It will be apparent to those skilled in the art that various modifications and variations can be made to the payload monitoring system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A payload monitoring system for a haul vehicle, comprising:
at least one emitter configured to direct an energy beam into the haul vehicle during relative movement between the at least one emitter and the haul vehicle;
at least one receiver configured to detect the energy beam and generate a corresponding signal; and
a controller in communication with the at least one receiver and configured to:
determine a loading condition of the haul vehicle based on the corresponding signal, wherein the loading condition is associated with at least one of an amount and a distribution of material inside the haul vehicle;
selectively generate a flag based on the amount of material inside the haul vehicle, the flag being indicative of a loading or unloading condition;
rank the flag based on distribution of the material within the haul vehicle;
automatically implement a future action based on the rank of the flag, wherein the future action includes spraying of fluid inside the haul vehicle to dislodge material remaining therein.

2. The payload monitoring system of claim 1, wherein the at least one emitter and the at least one receiver are mounted to a stationary gantry, and the controller is configured to determine the loading condition as the haul vehicle passes under the stationary gantry.

3. The payload monitoring system of claim 2, wherein the stationary gantry is associated with a feeder that fills the haul vehicle during loading.

4. The payload monitoring system of claim 1, wherein the at least one emitter and the at least one receiver are mounted to a mobile gantry, and the controller is configured to determine the loading condition as the mobile gantry passes over the haul vehicle when the haul vehicle is stationary.

5. The payload monitoring system of claim 4, wherein the mobile gantry is associated with a rotary dumper that turns the haul vehicle over during unloading.

6. The payload monitoring system of claim 1, wherein the controller is further configured to instruct an operator to manually implement a future action based on the rank of the flag.

7. The payload monitoring system of claim 1, wherein:
the controller is further configured to make a comparison of a known configuration of the haul vehicle and the loading condition; and
the controller is configured to selectively generate the flag based on the comparison.

8. The payload monitoring system of claim 7, further including an identification device configured to recognize an index affixed to the haul vehicle, wherein the controller is configured to retrieve the known configuration of the haul vehicle based on a signal from the identification device.

9. The payload monitoring system of claim 7, wherein:
the energy beam is a first energy beam;
the at least one emitter is further configured to direct a second energy beam onto an external portion of the haul vehicle;
the corresponding signal is a first signal;
the at least one receiver is further configured to detect the second energy beam and generate a second signal; and
the controller is configured to:
recognize the haul vehicle based on the second signal; and
retrieve the known configuration of the haul vehicle based on recognition of the haul vehicle.

10. The payload monitoring system of claim 1, wherein:
the at least one emitter is a laser; and
the at least one receiver is a camera.

11. A method of monitoring payload of a haul vehicle, comprising:
directing an energy beam from a source location into the haul vehicle during relative movement between the haul vehicle and the source location;
detecting the energy beam and generating a corresponding signal;
determining a loading condition of the haul vehicle based the corresponding signal, wherein the loading condition is associated with at least one of an amount and a distribution of material inside the haul vehicle;
selectively generating a flag based on the amount of material inside the haul vehicle, the flag being indicative of a loading or unloading condition;
selectively ranking the flag based on distribution of the material; and selectively implementing a future action based on the ranking, wherein the future action includes spraying of fluid inside the haul vehicle to dislodge material remaining therein.

12. The method of claim 11, further including making a comparison of a known configuration of the haul vehicle and the loading condition, wherein selectively generating the flag includes selectively generating the flag based on the comparison.

\* \* \* \* \*